United States Patent [19]
Shima et al.

[11] Patent Number: 5,132,688
[45] Date of Patent: Jul. 21, 1992

[54] PULSED DOPPLER RADAR SYSTEM HAVING AN IMPROVED DETECTION PROBABILITY

[75] Inventors: Akihiro Shima; Takahiko Fujisaka; Yoshimasa Ohashi, all of Kanagawa, Japan

[73] Assignee: Mitsubishi Denki Kabushiki Kaisha, Japan

[21] Appl. No.: 661,656

[22] Filed: Feb. 27, 1991

[30] Foreign Application Priority Data

Mar. 2, 1990 [JP] Japan .................. 2-51108

[51] Int. Cl.$^5$ .............................. G01S 7/34
[52] U.S. Cl. ...................... 342/91; 342/99; 342/160; 342/95
[58] Field of Search ........... 342/91, 28, 205, 159, 342/160, 162, 163, 84, 93, 94, 98, 99, 101

[56] References Cited

U.S. PATENT DOCUMENTS

| | | | |
|---|---|---|---|
| 3,643,257 | 2/1972 | Thomson et al. | 342/92 |
| 3,877,010 | 4/1975 | Holberg et al. | 342/161 |
| 3,877,011 | 4/1975 | Holberg et al. | 342/161 |
| 4,012,627 | 3/1977 | Antoniak | 342/93 X |
| 4,042,925 | 8/1977 | Albanese et al. | 342/132 |
| 4,057,800 | 11/1977 | Ganz | 342/101 |
| 4,709,236 | 11/1987 | Taylor, Jr. | 342/101 |
| 4,712,109 | 12/1987 | Galati et al. | 342/159 |
| 4,719,466 | 1/1988 | Farina et al. | 342/159 |
| 4,737,788 | 4/1988 | Kennedy | 342/29 |
| 4,845,500 | 7/1989 | Cornett et al. | 342/90 |
| 5,047,780 | 9/1991 | Dijkstra | 342/145 |
| 5,049,889 | 9/1991 | Hol et al. | 342/160 |
| 5,079,556 | 1/1992 | Itoh | 342/109 |

OTHER PUBLICATIONS

Morris, G. V., "Airborne Pulsed Doppler Radar", Artech House, Inc., 1988, pp. 58-61, 94 and 95.

*Primary Examiner*—John B. Sotomayor
*Attorney, Agent, or Firm*—Wolf, Greenfield & Sacks

[57] ABSTRACT

A pulsed doppler radar system having an improved detection probability, comprising an antenna unit, a transmitter for transmitting a signal through the antenna unit, a receiver for receiving a signal reflected by a target through the antenna unit to provide a reception signal. A processing unit which receives the reception signal from the receiver determines, in accordance with a range of the target and a signal-to-noise ratio and bandwidth of the reception signal, an optimum integration number which maximizes the detection probability and performs coherent integration on the reception signal by the number of times equal to the determined optimum integration number thereby outputting a signal having a predetermined level. Such a signal is fed to a display and an image of the target is displayed on a display.

12 Claims, 6 Drawing Sheets

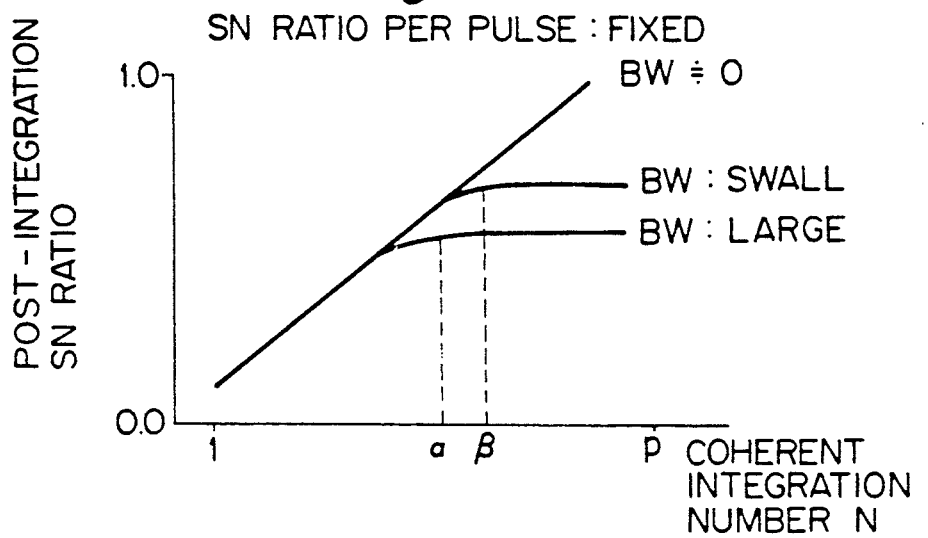
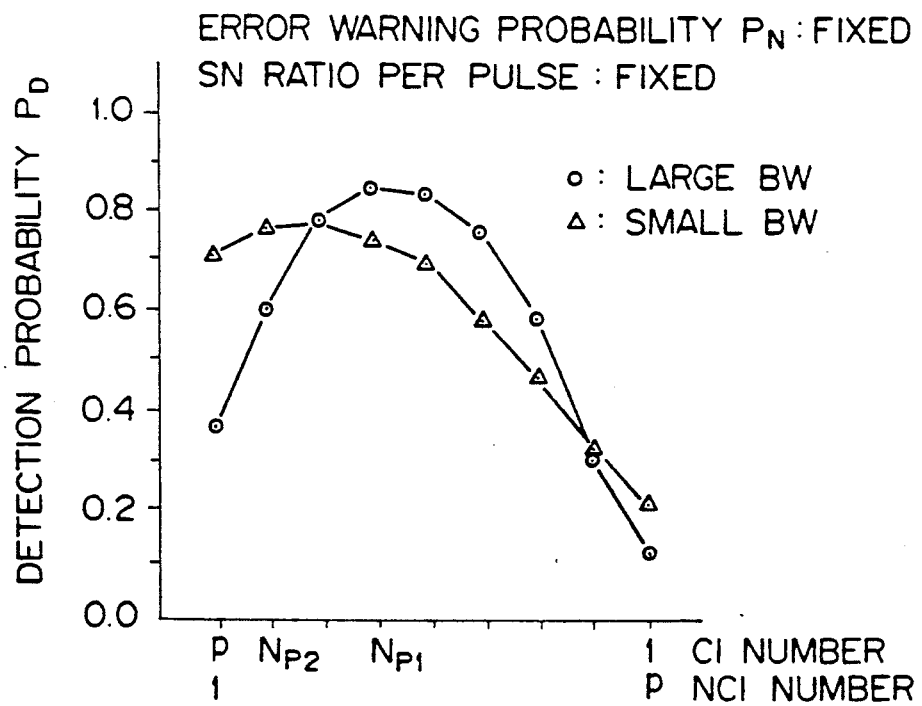

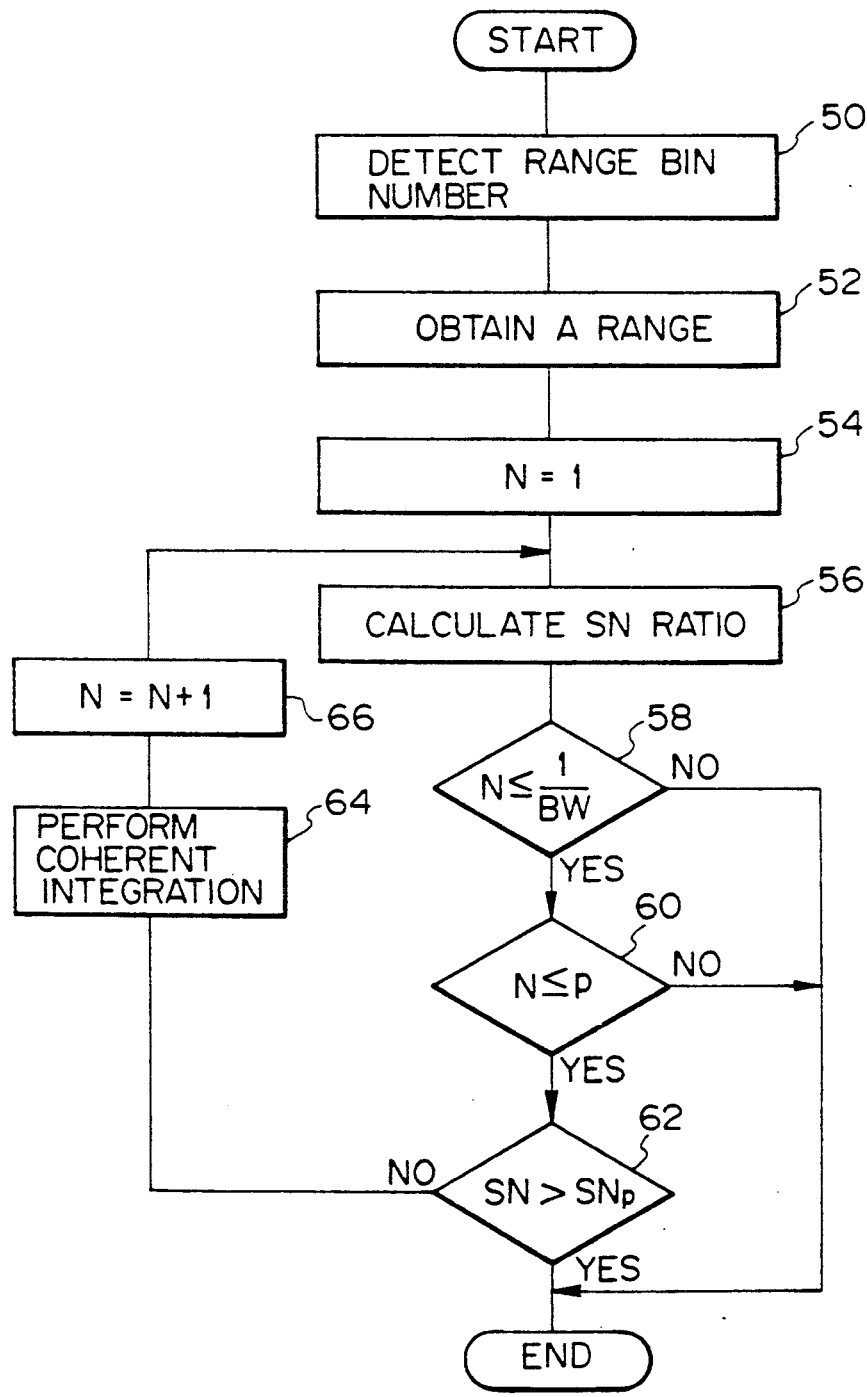

PULSED DOPPLER RADAR SYSTEM HAVING AN IMPROVED DETECTION PROBABILITY

BACKGROUND OF THE INVENTION

1. Field of the Invention

The present invention relates to a pulsed doppler radar system having a detection probability which is not reduced by a change in a frequency band of a receiving signal and a signal-to-noise ratio.

2. Prior Art

FIG. 1 is a block diagram showing the construction of a conventional pulsed doppler radar system as disclosed in "Air-borne Pulsed Doppler Radar" written by G. V. Morris and published by Artec House, Inc. in 1988. In the figure, a transmitter 2 is connected through a TR switch 4 to an antenna 6 which is in turn connected to a receiver 8. A signal received by the receiver 8 passes through an A/D converter 10 and is fed to a plurality M of range bins $12_1-12_M$. These range bins have their own numbers as shown in FIG. 1.

The signals output from the range bin $12_1$ are fed through a plurality L of doppler filters $14_1-14_L$ to a plurality L of magnitude detectors $16_1-16_L$. The respective magnitude detectors are connected through a plurality L of non-coherent integrators $18_1-18_L$ to a plurality L of threshold detectors $20_1-20_L$. The remaining signals belonging to the range bins $12_2-12_M$ are processed in a manner similar to the above described. The outputs of the threshold detectors are fed to a display 22.

In operation, a transmitted signal is produced by the transmitter 2 and radiated from the antenna 6 toward a target. The transmitted signal is then reflected by the target and received by the antenna 6. The received signal is fed through the TR switch 4 to the receiver 8 where the received signal is converted to a complex video signal. The complex video signal is fed to the A/D converter 10 and converted to a digital signal thereby. The digital signal is separated and fed to M range bins $12_1-12_M$ provided in accordance with M different ranges. These range bins output respective range signals. The range signal output from the range bin $12_1$ is fed to corresponding doppler filters $14_1-14_L$ for the purpose of velocity measurement. These doppler filters effect coherent integration (pre-detection integration) of the range signal. The outputs of the doppler filters $14_1-14_L$ are then magnitude-detected by the magnitude detectors $16_1-16_L$ and subjected to non-coherent integration (post-detection integration) by the non-coherent integrators $18_1-18_L$. When the level of the output signals from the non-coherent integrators $18_1-18_L$ exceeds threshold levels preset in the threshold detectors $20_1-20_L$, a target is detected and displayed on the display 22.

In such a conventional pulsed doppler radar system as described above, an integration number of coherent integration and an integration number of non-coherent integration are fixed regardless of any change in a frequency bandwidth of the doppler spectrum of a received signal (hereinafter called a "received signal frequency bandwidth") and a signal-to-noise ratio of the received signal. Assuming the coherent integration number to be Nc and the total number of pulse hits to be P, the non-coherent integration number is then equal to P/Nc. Therefore, such a conventional pulsed radar system constructed as described above has a problem of limited detection probability.

SUMMARY OF THE INVENTION

The present invention has been proposed to solve such a problem as described above. It is therefore an object of the present invention to provide a radar system which optimizes a pulse integration number in accordance with a received signal frequency band and a signal-to-noise ratio of the received signal, thereby improving a detection probability in a given false alarm probability in comparison with the case where a pulse integration number is fixed.

In order to achieve such an object as described above, an embodiment of a pulsed doppler radar system according to the present invention comprises:

an antenna unit;

a transmitter for transmitting a signal through the antenna unit;

a receiver for receiving a signal reflected by a target through the antenna unit to provide a reception signal;

a processing means which receives the reception signal from the receiver to determine, in accordance with a range of the target and a signal-to-noise ratio and bandwidth of the reception signal, an optimum integration number which maximizes the detection probability, so as to perform integration on the reception signal by the number of times equal to the determined optimum integration number thereby outputting a signal having a predetermined level; and a display means responsive to the signal to display an image of the target thereon.

The processing means may include a plurality of range bins which receive the reception signal to cause the reception signal to be output from a range bin corresponding to the range of the target.

The processing means may further comprise a plurality of detecting devices, each of the detecting devices being connected to a corresponding one of the range bins to detect the bandwidth of the reception signal fed from the corresponding range bin.

The processing means may further comprise a plurality of coherent integrators. Each of the integrators is connected to a corresponding one of the range bins and the detecting devices to receive the reception signal and a signal indicating the bandwidth of the reception signal in order to determine an optimum integration number in accordance with an SN ratio and bandwidth of the reception signal and the range of the target, each of the integrators being operative to perform coherent integration on the reception signal by the number of times equal to the determined optimum integration number.

According to the present invention, an optimum integration number which maximizes a detection probability can be determined in accordance with the range of a target and a signal-to-noise ratio and bandwidth of a received signal, and coherent integration is effected by a number of times equal to the determined optimum integration number, thereby improving a detection probability of a radar system in comparison with a conventional radar system where a fixed number of coherent integration is performed.

The above and other objects and advantages will become clearer from the following detailed description of the invention with reference to the accompanying drawings.

BRIEF DESCRIPTION OF THE DRAWINGS

FIG. 4 is a graph showing a relationship between a coherent integration number N and a post-coherent-integration SN ratio;

FIG. 5 is a graph showing a relationship between a coherent integration number N and a detection probability $P_D$;

FIG. 6 is a flowchart showing an operation of a coherent integrator shown in FIG. 2.

DESCRIPTION OF A PREFERRED EMBODIMENT

Figure 1:
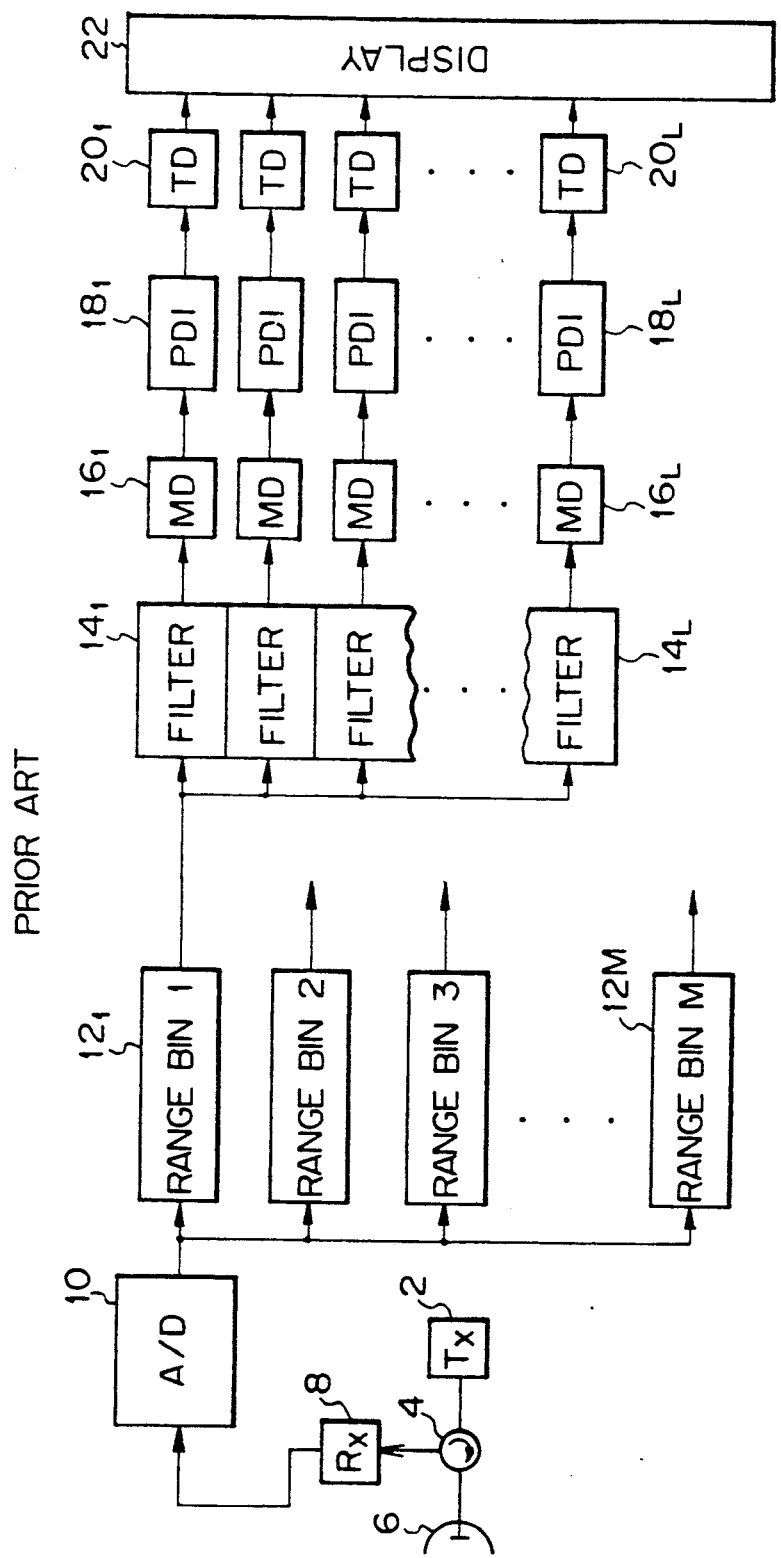
FIG. 1 is a block diagram showing the construction of a pulsed doppler radar system of the prior art.
Figure 2:
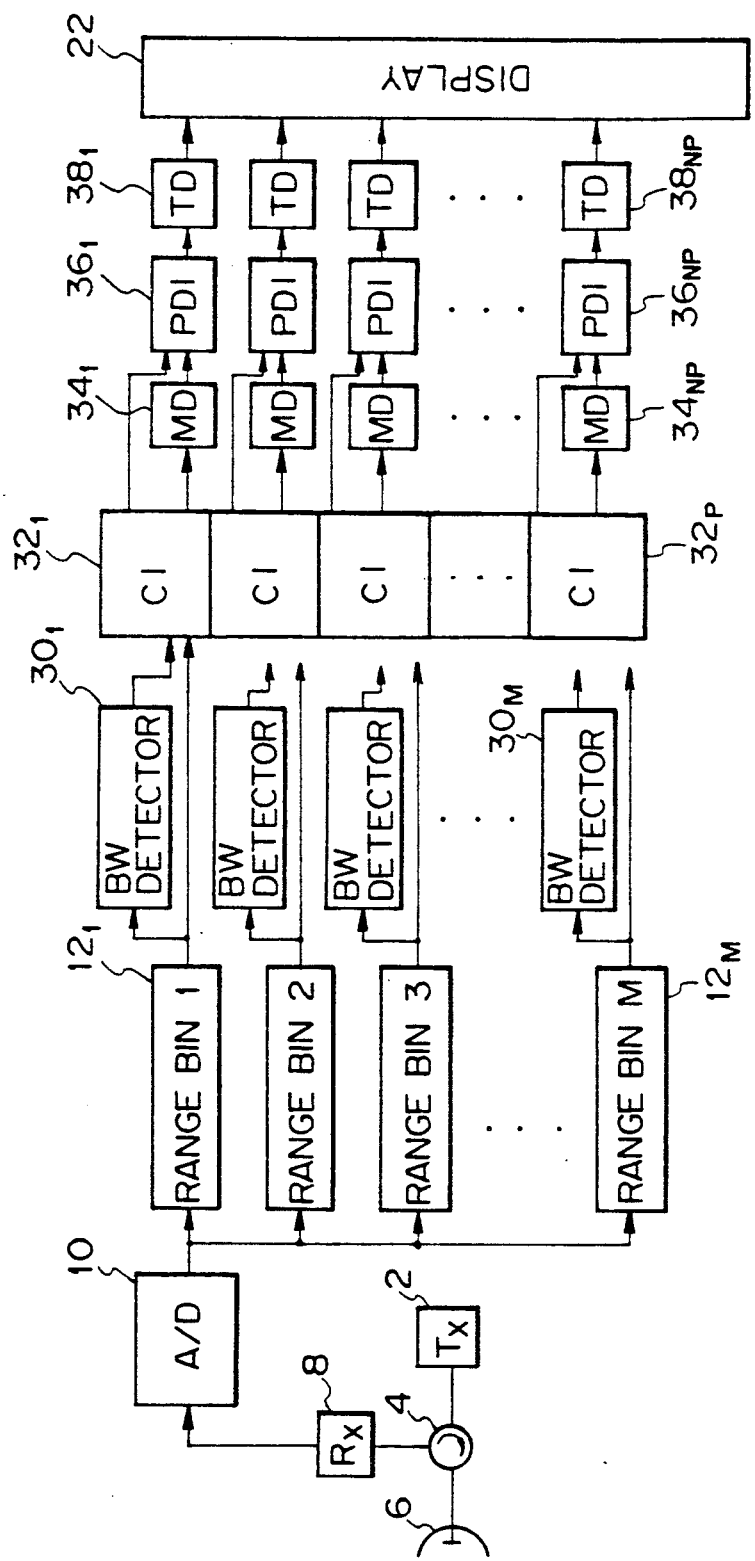
FIG. 2 is a block diagram showing the construction of an embodiment of a pulsed doppler radar system according to the present invention.

FIG. 2 is a block diagram showing the construction of an embodiment of a pulsed doppler radar system according to the present invention. In this figure, the same reference numerals as used in FIG. 1 designate like or corresponding elements and an explanation thereof is omitted here.

The pulsed doppler radar system of this embodiment includes detecting devices $30_1$–$30_M$ connected to the output terminals of the corresponding range bins $12_1$–$12_M$ for detecting a frequency bandwidth of a received signal and a plurality of coherent integrators. The outputs of the range bin $12_1$ and the detecting device $30_1$ are supplied to the corresponding coherent integrators $32_1$–$32_P$. The outputs of the remaining range bins $12_2$–$12_M$ and the remaining detecting devices $30_2$–$30_M$ are similarly supplied to the corresponding coherent integrators (not shown). Each of the coherent integrators includes a device for determining an optimum integration number $N_P$. The outputs of the coherent integrator are provided to a plurality $N_P$ of magnitude detectors $34_1$–$34_{NP}$ and non-coherent integrators $36_1$–$36_{NP}$ which are in turn connected through a plurality $N_P$ of threshold detectors $38_1$–$38_{NP}$ to a display 22.

A number P of coherent integrators, magnitude detectors, non-coherent integrators and threshold detectors are provided, but only a number $N_P$ (optimum integration number) of coherent integrators, magnitude detectors, non-coherent integrators and threshold detectors are used.

In operation, a transmission signal is transmitted from the transmitter 2 through the TR switch 4 and the antenna 6 to a target. A signal reflected by the target is received through the antenna 6 and the TR switch 4 by the receiver 8 where the received signal is converted to a complex video signal. The complex video signal is converted to a digital signal by the A/D converter 10, and the digital signal is separated to the range bins $12_1$–$12_M$ provided for different ranges. The output of the range bin $12_1$ is supplied to the corresponding detecting device $30_1$ for detecting a frequency bandwidth of the received signal as well as to the coherent integrators $32_1$–$32_P$ which include the optimum integration number determining devices. The operation of the range bins $12_2$–$12_M$ and the detecting devices $30_2$–$30_M$ is similar to that of the range bin $12_1$ and the detecting device $30_1$.

Figure 3:
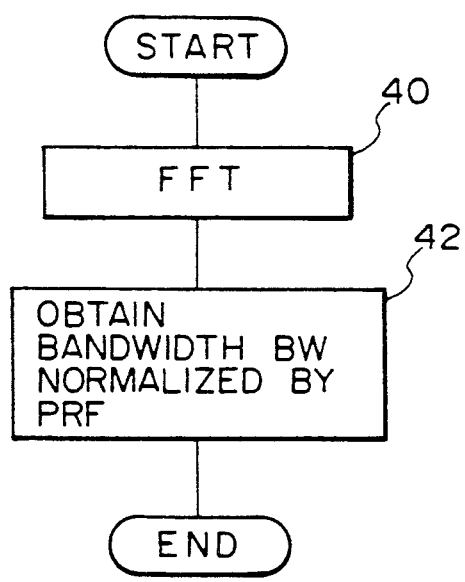
FIG. 3 is a flowchart showing an operation of a detecting device shown in FIG. 2.

FIG. 3 shows a flowchart for explaining an operation of each detecting device. In a step 40, the detecting device performs a Fast-Fourier transform on the digital signal output from the corresponding range bin. In a step 42, a bandwidth BW of a doppler spectrum of the received signal which is normalized by a pulse repetition frequency (PRF) is obtained.

Each of the coherent integrators $32_1$–$32_P$ is arranged to determine an optimum integration number Np in accordance with a flowchart shown in FIG. 6 (described in detail later) and performs a coherent integration. The outputs of the coherent integrators are magnitude-detected by the magnitude detectors $34_1$–$34_{NP}$ and the detected signals are subjected to a non-coherent integration (post-detection integration) at the non-coherent integrators $36_1$–$36_{NP}$. At this stage, a non-coherent integration number is equal to P/Np where P is the total number of pulse hits. The outputs of the non-coherent integrators $36_1$–$36_{NP}$ are fed to the threshold detectors $38_1$–$38_{NP}$. If at least one of these outputs exceeds the preset level, a target is determined to have been detected and the existence of the target is displayed on the display 22.

A principle for determining an integration number optimum for the above described coherent integration performed in each coherent integrator will next be explained. FIG. 4 shows examples of a relationship between a coherent integration number N and an SN ratio (post-coherent-integration signal power-to-noise power ratio) when an SN ratio per pulse of a received signal is set to a predetermined value. It can be understood from FIG. 4 that if no fluctuation is found in a received signal, that is, the bandwidth of the received signal $BW \approx 0$, the post-coherent-integration SN ratio is improved as the integration number N becomes larger. It is known that the coherent integration number Np which maximizes a detection probability $P_D$ is equal to the total pulse hit number P when an error warning probability $P_N$ is given.

On the other hand, if there is a fluctuation in a signal received from a moving target, the post-coherent-integration SN ratio can not be improved any more in a region larger than a certain integration number, even if the integration number N is increased. The reference symbols $\alpha$ and $\beta$ designate coherent integration numbers which are equal to the inverse of the bandwidth of the respective received signals and at which the SN ratio is saturated in the case where fluctuation in a received signal exists.

FIG. 5 shows examples of a relationship between a coherent integration number N and a detection probability $P_D$ when a bandwidth of a received signal is changed under a condition where an error warning probability $P_N$ and an SN ratio per pulse of the received signal are given. It is noted that a non-coherent integration number can be expressed to be P/N. Those examples are results of computer simulation using a radar model.

A relationship between N and P similar to FIG. 5 can be obtained by changing any one of the SN ratio per pulse of a received signal and the receiving signal bandwidth as a parameter. Each time such a relationship is obtained, the coherent integration number which maximizes a detection probability $P_D$ (i.e., an optimum integration number $N_P$) can be determined. Such determined optimum integration numbers $N_P$ are smaller than the inverses of the bandwidths of the received signals.

A post-coherent-integration SN ratio corresponding to an optimum integration number is designated by $SN_P$ and such SN ratios obtained are prestored in a computer. Each coherent integrator is arranged to be able to take, out of a table, optimum integration numbers $N_P$ determined by received signal bandwidths and target ranges (converted from SN ratios per pulse) measured on-line.

An operation of any one of the coherent integrators $32_1$–$32_M$ will next be explained in reference to FIG. 6. In a step 50, a range bin number m is detected and, in a step 52, a target range R is calculated from the following equation:

$$R = cm\tau/2 \qquad (1)$$

where c is the velocity of light ($=3\times10^8$ m/sec) and $\tau$ is a width of a transmitted pulse.

In a step 54, the initial value of the coherent integration number N is set to one (1) and, in a step 56, an SN ratio is calculated on the basis of the following equation:

$$SN = P_t \eta p G_T G_R \lambda^2 \sigma N / (4\pi)^3 R^4 (NF) kTBL \qquad (2)$$

where Pt is a peak power of a transmitted pulse, $\eta p$ is a pulse compression ratio, $G_T$ is a transmission antenna gain, $G_R$ is a reception antenna gain, $\lambda$ is a transmission wavelength, R is a range between the radar and a target, NF is a noise figure of the receiver, k is a Boltzmann's constant, T is the absolute temperature, B is a bandwidth of the receiver, $\sigma$ is a radar cross section of a target, and L is a correcting value. The correcting value L, which changes as a pulse integration number and the bandwidth of a received signal change, is prestored in a table in a computer and read out of the table when SN is calculated.

When the coherent integration number N=1, an SN ratio per pulse of a received signal is obtained, and, when N=n, a post-coherent-integration SN ratio when the integration number N is equal to n is obtained.

In a step 58, a comparison is made, using a received signal bandwidth normalized by a pulse repetition frequency, BW, obtained in the step 42 (FIG. 3), between a coherent integration number N and 1/BW. If N is larger than 1/BW, the procedure ends.

If N is equal to or smaller than 1/BW, a step 60 is performed. In this step, a total number of pulse hits P is compared with a coherent integration number N. If N>P, the procedure ends. If N≤P, the SN ratio obtained in the step 56 and an optimum integration number $N_P$ determined by a received signal bandwidth and a target range measured on-line and taken out of the table are compared with each other in a step 62. If the SN ratio is equal to or smaller than $SN_P$, the coherent integrators $32_1$–$32_P$ perform the coherent integration in a step 64 and N is incremented by one in a step 66. Then a new SN ratio is calculated in the step 56 and the subsequent steps 58, 60, 62, 64 and 66 are repeated until the SN ratio becomes equal to $SN_P$.

When the SN ratio becomes equal to $SN_P$, the coherent integration number $N_P$ which maximizes a detection probability $P_D$ under a given error warning probability $P_N$ in accordance with a received signal bandwidth per pulse and a target range, that is, an optimum integration number, is obtained, and the coherent integration performed in the coherent integrators ends.

Figure 7:
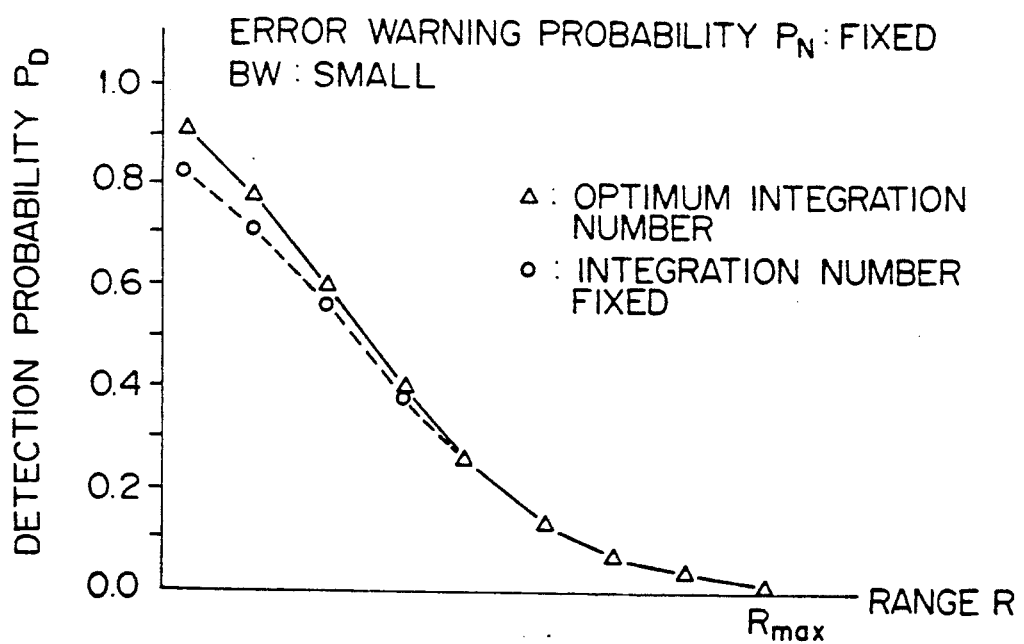
FIG. 7 is a graph showing a relationship between a range and a detection probability $P_D$.

FIG. 7 shows examples of a relationship between a target range R and a detection probability $P_D$ in the case where an error warning probability $P_N$ is given and a received signal bandwidth BW has a small value. In this figure, the range R is obtained by conversion of an SN ratio per pulse of a received signal. A solid line indicates the case where a coherent integration number is equal to an optimum integration number $N_P$, and a dotted line indicates the case where a coherent integration number is fixed to a total pulse hit number P. The difference between these solid and dotted lines indicates an improvement of the detection probability.

The R-$P_D$ relationship shown in FIG. 7 can be obtained by preparing different N-$P_D$ relationships with various SN ratios, as shown in FIG. 5. First, N-$P_D$ relationships are obtained under different SN ratios and the maximum detection probability and the maximum number of coherent integration are obtained for each SN ratio. Since the ranges can be obtained from the conversion of the SN ratios per pulse of a received signal, it is possible to draw graphs showing a relationship between the maximum detection probability and the range (the solid line in FIG. 7) and a relationship between the maximum coherent integration number and the range (the dotted line in FIG. 7).

The invention has been described in detail with particular reference to a certain preferred embodiment thereof; but it will be understood that variations and modifications can be effected within the spirit and scope of the invention.

What is claimed is:

1. A pulsed doppler radar system having an improved detection probability for a plurality of radar signals, comprising:
    an antenna unit;
    a transmitter for transmitting a plurality of signals through said antenna unit;
    a receiver for receiving a plurality of signals reflected by one or more targets through said antenna unit to provide a plurality of reception signals;
    a processing means which receives said reception signals from said receiver to determine for each said reception signal, in accordance with a range of the corresponding target and a signal-to-noise ratio and bandwidth of said reception signal, an optimum integration number which maximizes the detection probability, so as to perform integration on each of said reception signals by the number of times equal to the respective determined optimum integration number determined therefor, thereby outputting a plurality of signals each having a predetermined level; and
    a display means responsive to said outputted signals to display an image of the target thereon.

2. A system as claimed in claim 1 wherein said processing means includes a plurality of range bins which receive said reception signals to cause each said reception signal to be output from a range bin corresponding to the range of the target.

3. A system as claimed in claim 2 wherein said processing means further comprises a plurality of detecting devices, each of said detecting devices being connected to a corresponding one of said range bins to detect the bandwidth of said reception signal fed from the corresponding range bin.

4. A pulsed doppler radar system having an improved detection probability, comprising:
    an antenna unit;
    a transmitter for transmitting a signal through said antenna unit;

a receiver for receiving a signal reflected by a target through said antenna unit to provide a reception signal;

a processing means which receives said reception signal from said receiver to determine, in accordance with a range of the target and a signal-to-noise ratio and bandwidth of said reception signal, an optimum integration number which maximizes the detection probability, so as to perform integration on said reception signal by the number of times equal to the determined optimum integration number thereby outputting a signal having a predetermined level; and a display means responsive to said signal to display an image of the target thereon, wherein said processing means includes a plurality of range bins which receive said reception signal to cause said reception signal to be output from a range bin corresponding to the range of the target, wherein said processing means further comprises a plurality of detecting devices, each of said detecting devices being connected to a corresponding one of said range bins to detect the bandwidth of said reception signal fed from the corresponding range bin, and wherein said processing means further comprises a plurality of coherent integrators, and wherein each of said integrators is connected to a corresponding one of said range bins and said detecting devices to receive said reception signal and a signal indicating the bandwidth of said reception signal in order to determine an optimum integration number in accordance with an S/N ratio and bandwidth of said reception signal and the range of the target, each of said integrators being operative to perform coherent integration on said reception signal by the number of times equal to the determined optimum integration number.

5. A system as claimed in claim 1 wherein said processing means includes a plurality of bandwidth detectors and a like plurality of coherent integrators, wherein each of said coherent integrators is connected to receive a signal from a corresponding one of said bandwidth detectors.

6. A pulsed doppler radar system having an improved detection probability for a plurality of radar signals and including an antenna unit, a transmitter for transmitting a plurality of signals through said antenna unit, and a receiver for receiving a plurality of signals reflected by one or more targets through said antenna unit to provide a plurality of reception signals, said system comprising:

a processing means which receives said reception signals from said receiver to detect a range of the corresponding target and a signal-to-noise ratio and bandwidth of each said reception signal;

an integration means responsive to each said detected range, signal-to-noise ratio and bandwidth to determine respective optimum integration numbers which respectively maximize the detection probability for the corresponding reception signal and to perform integration on each of said reception signals by the number of times equal to the respective optimum integration number determined therefor;

a detection means for magnitude-detecting a plurality of outputs from said integration means thereby outputting a plurality of signals each having a predetermined level; and a display means responsive to said outputted signals to display an image of the target thereon.

7. A system as claimed in claim 6 wherein said processing means includes a plurality of range bins which receive said reception signals to cause each said reception signal to be output from a range bin corresponding to the range of the target.

8. A pulsed doppler radar system having an improved detection probability and including an antenna unit, a transmitter for transmitting a signal through said antenna unit, and a receiver for receiving a signal reflected by a target through said antenna unit to provide a reception signal, said system comprising:

a processing means which receives said reception signal from said receiver to detect a range of the target and a signal-to-noise ratio and bandwidth of said reception signal;

an integration means responsive to said detected range, signal-to-noise ratio and bandwidth to determine an optimum integration number which maximizes the detection probability and to perform integration on said reception signal by the number of times equal to the determined optimum integration number;

a detection means for magnitude-detecting an output from said integration means thereby outputting a signal having a predetermined level; and a display means responsive to said signal to display an image of the target thereon, wherein said processing means includes a plurality of range bins which receive said reception signal to cause said reception signal to be output from a range bin corresponding to the range of the target, and wherein said processing means further comprises a plurality of detecting devices, each of said detecting devices being connected to a corresponding one of said range bins to detect the bandwidth of said reception signal fed from the corresponding range bin.

9. A pulsed doppler radar system having an improved detection probability and including an antenna unit, a transmitter for transmitting a signal through said antenna unit, and a receiver for receiving a signal reflected by a target through said antenna unit to provide a reception signal, and a plurality of range bins which receive said reception signal to cause said reception signal to be output from a range bin corresponding to the range of the target, said system comprising:

a plurality of detecting devices, each connected to a corresponding one of said range bins to receive said reception signal from said corresponding range bin so as to detect the bandwidth of said reception signal;

a plurality of coherent integrators, each connected to a corresponding one of said range bins and said detection devices to determine, in accordance with the range of the target and the signal-to-noise ratio and bandwidth of said reception signal, an optimum integration number which maximizes the detection probability and to perform coherent integration on said reception signal by the number of times equal to said determined optimum integration number;

a plurality of magnitude detectors, each connected to a corresponding one of said coherent integrators to detect the magnitude of the coherent-integrated signal fed from said corresponding coherent integrator;

a plurality of non-coherent integrators, each connected to a corresponding one of said magnitude detectors to perform non-coherent integration on an output from the corresponding magnitude detector;

a plurality of threshold detectors, each connected to a corresponding one of said non-coherent integrators to provide a signal when an output from said corresponding non-coherent integrator exceeds a predetermined level; and a display which receives a signal from any one of said threshold detectors to display an image of the target.

10. A system as claimed in claim 8 wherein said integration means is connected to said plurality of range bins and to said plurality of detecting devices.

11. A pulsed doppler radar system having an improved detection probability and including an antenna unit, a transmitter for transmitting a signal through said antenna unit, and a receiver for receiving a signal reflected by a target through said antenna unit to provide a reception signal, and a plurality of range bins which receive said reception signal to cause said reception signal to be output from a range bin corresponding to the range of the target, said system comprising:

a plurality of detecting devices, each connected to a corresponding one of said range bins to receive said reception signal from said corresponding range bin so as to detect the bandwidth of said reception signal; and a plurality of coherent integrators, each connected to a corresponding one of said range bins and to a corresponding one of said detection devices to determine, in accordance with the range of the target and the signal-to-noise ratio and bandwidth of said reception signal, an optimum integration number which maximizes the detection probability and to perform coherent integration on said reception signal by the number of times equal to said determined optimum integration number.

12. A system as claimed in claim 11, further comprising:

a plurality of magnitude detectors, each connected to a corresponding one of said coherent integrators to detect the magnitude of the coherent-integrated signal fed from said corresponding coherent integrator.

* * * * *